Figure 1:
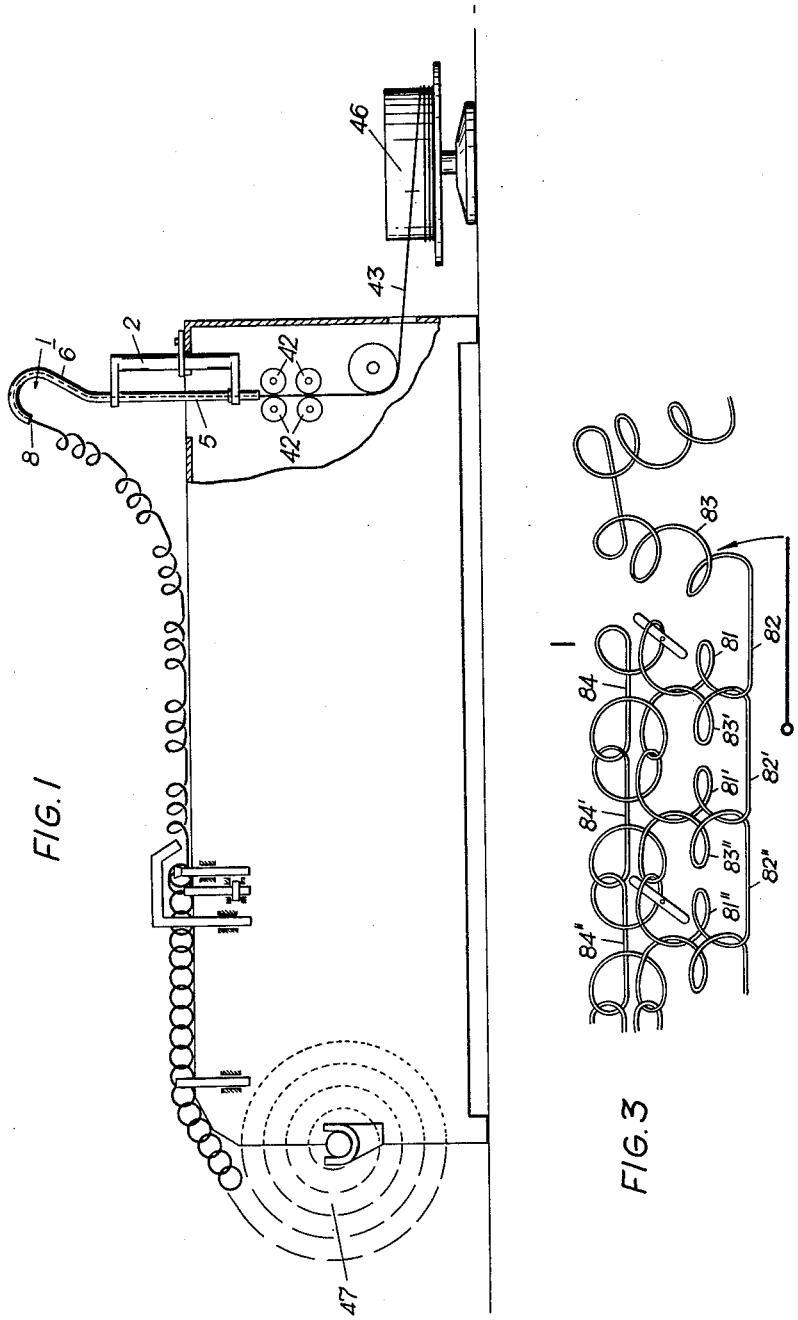

June 15, 1965     W. G. GERSTORFER     3,188,845
MACHINE FOR THE MANUFACTURE OF COMPRESSION SPRING STRIPS
Filed March 22, 1962     2 Sheets-Sheet 1

Wilhelm G. GERSTORFER
inventor by

Karl J. Ross
AGENT

June 15, 1965  W. G. GERSTORFER  3,188,845
MACHINE FOR THE MANUFACTURE OF COMPRESSION SPRING STRIPS
Filed March 22, 1962  2 Sheets-Sheet 2

Wilhelm G. GERSTORFER
inventor
by

Karl G. Ross
AGENT

United States Patent Office 3,188,845
Patented June 15, 1965

3,188,845
MACHINE FOR THE MANUFACTURE OF
COMPRESSION SPRING STRIPS
Wilhelm G. Gerstorfer, 20 Peter Mayrstrasse,
Innsbruck, Austria
Filed Mar. 22, 1962, Ser. No. 181,728
Claims priority, application Austria, Mar. 23, 1961,
A 2,377/61
10 Claims. (Cl. 72—138)

This invention relates to a machine for the manufacture of compression spring strips which serve for the formation of spring inserts for cushions and the like and which consist of a continuous wire of steel or the like. In these strips, a right-handed compression spring is followed by a left-handed compression spring, which extends approximately parallel to the former; it is connected by a connecting portion. The previously known apparatus for the manufacture of compression spring strips have the disadvantage that they are not automatic in operation and are incapable, e.g., of making compression-spring strips comprising left- and right-handed compression springs or of compactly storing the strips. As contrasted therewith, the machine designed according to the invention enables the manufacture of spring strips in which right- and left-handed compression springs alternate and eliminates the need for manual work in any of the operations in which the ordinary coil of wire is transformed into a compression spring strip stored in large rolls.

This is achieved according to the invention in that all tools serving to shape the wire, particularly those used for imparting a curvature to the wire and for determining the amount and direction of the lead, are mounted in a pivotally movable shaping head and the movable tools serving for shaping the wire are coupled to the drive means for the pivotal movement of the shaping head to move in synchronism therewith.

As a result of the controlled pivotal movement of the entire shaping head, incorporating the bending roller and the lead pocket, the compression-spring strip thus formed will always emerge from the shaping head in the same direction relative to the machine independently of the degree and "hand" of the individual compression springs and any links connecting them.

It is particularly desirable to provide a wire guide which initially extends approximately in the middle of the pivotal axis of the shaping head and then along an arc relative to said axis, and a bending roller, known per se, which is disposed in an adjustable position at the outlet end of the wire guide.

The machine according to the invention may be combined with a successively arranged device which is moved in synchronism with the shaping head and serves for hooking each compression spring together with the preceding one, and supplying them to a storage drum following said device and forwardly thereof.

The invention relates also to various details of the structure of the apparatus.

Figure 2:
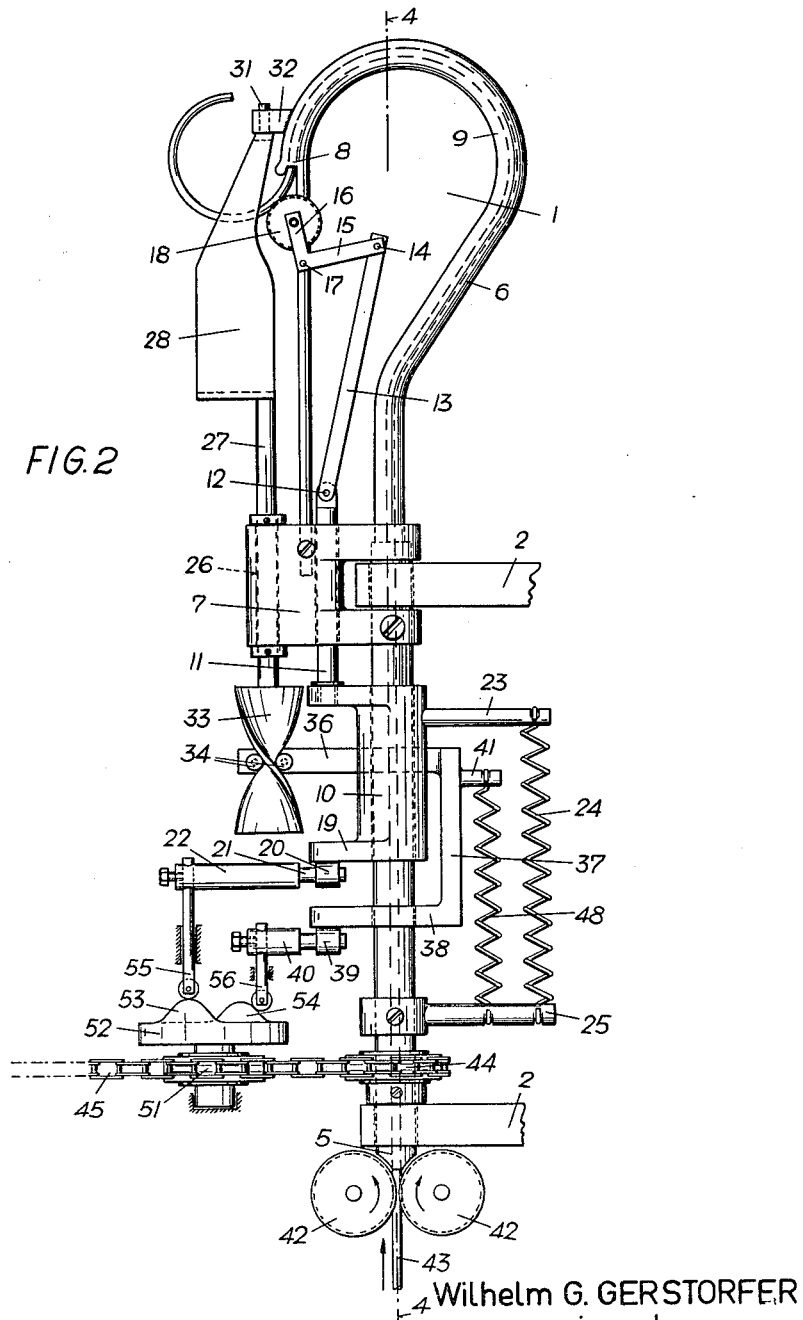

An allustrative embodiment of a machine embodying the invention is shown in the accompanying drawing in which FIG. 1 is a side-elevational view showing the entire machine with the shaping head illustrated somewhat diagrammatically, FIG. 2 is a side-elevational view showing the shaping head on a larger scale; and FIG. 3 is a perspective view showing a portion of the spring strip viewed from the side.

The entire shaping head 1 is mounted on the automatic machine by means of two bearing plates 2 for pivotal movement about an axis 4. The shaping head 1 is provided at its lower end portion with a shaft 5, which is rotatably mounted and supported by the bearing plates 2. These bearing plates 2 are connected to the main frame of the machine, as is shown in FIG. 1. The upper end of the shaft 5 is continued by a hook-shaped wire guide, which consists of two firmly connected parts, namely, an inner arcuate member 9 and an outer arcuate member 6. The shaft 5 is formed with a central longitudinal bore, which slidably receives the wire. This bore is continued by a passage defined by and between the arcuate members 6 and 9 and terminating at the outlet 8. A U-shaped bracket or support 7 is rigidly connected to the shaft 5 and the arcuate members 6 and 9 and provides bearing means for the linkage for the bending roller and the lead pocket, which linkage will be described hereinafter. A sleeve 10 is axially slidably mounted on the shaft 5. It carries an upwardly extending rod 11, which is axially slidably mounted in the bracket 7 and has pivoted to its upper portion at 12 another rod 13, the upper end of which is pivotally connected by a pivot 14 to one arm 15 of a bell-crank lever pivoted to the arcuate member 9 at 17. Beyond the outlet 8, the inner arcuate member has a depending extension which carries the pivot 17 and is rigidly connected to the bracket 7. A bending roller 18 is rotatably mounted in the other arm 16 of the bell-crank lever. The sleeve 10 comprises a disk-like portion 19 extending at right angles to the shaft 5. A segment of this plate rests on a roller 20 i.e., a surface of a solid of revolution, which is mounted for rotation about a substantially horizontal axis 21 on a vertically movable member 22 of a linkage, which will be described more fully hereinafter. On its side opposite to the hook end 8, the movable sleeve 10 carries a protruding arm 23, which is urged toward a stationary arm 25 by a tension spring 24.

The bracket 7 is formed with a vertical bore 26 which is spaced a greater distance from the axis 4 than is the rod 11. A shaft 27 is rotatably but axially nondisplaceably mounted in this bore 26. This shaft 27 carries at its upper end a pocket 28 consisting of two identical plates, which define a space between them. The two plates are interconnected at their top end and have a pin 31 welded to them, which is rotatably mounted in a bearing sleeve 32 disposed at the end of the outer arcuate member 6.

At its lower end, which freely protrudes below the bracket 7, the shaft 27 carries a screw member 33 having a relatively great lead or pitch. The upper limb 36 of two parallel limbs 36, 38 of a U-shaped bracket 37 carries two horizontally extending rollers 34, which cooperate with the screw member 33 like two half nuts. The limbs 36 and 38 are a sliding fit on the sleeve 10 and the shaft 5, respectively. The lower limb 38 carries a disk-shaped portion extending at right angles to the shaft and a segment of this disk-shaped portion rests on a roller 39, i.e., a surface of a solid of revolution which is mounted on a member 40 of a vertically movable linkage which will be described more fully hereinafter. A tension spring 48 is connected to a protruding lug 41 of the bracket 37 and the lower end of this tension spring is hooked on the stationary arm 25 so that this spring tends to pull the bracket 37 downwardly. Forwardly of the lower end of the tubular shaft 5, the two feed rollers 42 for the wire 43 to be bent are provided. A rotation of the shaping head 1 about its axis 4 is effected by a sprocket wheel 44, which is secured above the lower bearing 2 to the shaft 5 and which can be rotated through an angle of up to 90° in both directions by a chain 45 driven by suitable means, not shown, which are operated to cause the shaping head to perform a pivotal movement about its axis 4.

The wire 43 from which the compression spring strip is to be manufactured is fed from a capstan 46 to the rolls 42, which feed the wire into the interior of the shaft 5. The wire is then guided through the hook-shaped end 6, from which it emerges at 8. Below the outlet, the bending roller 18 is disposed, which imparts to the wire emerging at 8 a more or less pronounced curvature, depending on the position of the outlet end 8 relative to the roller 18, which can be adjusted by an upward or downward movement of the sleeve 10. A lead can be imparted to the emerging wire by a rotation of the pocket 28 relative to the shaping head 1. Thus, all desired shapes can be imparted to the wire portion and nevertheless the compression spring strip manufactured leaves the shaping head 1 always in one and the same direction.

To manufacture the compression spring strip shown in the present example, the wire 43 must be bent so that a right-handed convoluted compression spring having 2½ turns is continued by a U-shaped connecting portion and then by a left-handed convoluted compression spring having 2½ turns, which is again followed by a U-shaped connecting portion. This results in the formation of a compression spring strip having trapezium-shaped waves, the U-shaped connecting portions extending in the longitudinal direction of the compression spring strip and the left- and right-handed compression springs forming the oblique sides of the trapeziums. The limbs of the U-shaped connecting portions should desirably include angles exceeding 90° with the cross pieces because this will provide for the initial stress required for hooking. FIG. 3 is a diagrammatic view of such a compression spring strip coming out of the shaping head and the manner in which the individual compression springs of said strip are hooked together. 81, 81' are right-handed compression springs, 82, 82', are succeeding connecting portions, 83, 83', are left-handed compression springs and 84, 84', are succeeding connecting portions.

When it is desired to vary the curvature of the wire, the linkage member 22 is caused by suitable control means to move up and down in synchronism with the pivotal movement of the shaping head. This will also cause an up and down movement of the sleeve 10 and the rod 11 secured to it. An upward movement of the rod 11 will cause a forward movement and a downward movement of the rod will cause a rearward movement of the roller 18.

The up and down movement of the linkage member 40 causes an up and down movement of the bracket 37. By means of the rollers 34, this causes a rotation of the screw 33 and of the pocket 28 so that the angle between the emerging wire and the shaping head 1 can be changed.

From the above description it is apparent that the chain 45 and the sprocket 44 form drive means operatively connected to the shaping head and operable to pivotally move the same and that the bending roller 18 and the pocket 28 form tool means mounted on the shaping head and adjustable relative thereto to selected positions and adapted to act in conjunction with said shaping head on the wire fed through the shaping head to form convolutions of selected "hand," curvature and lead in said wire in dependence on the adjusted position of said tool means. It is further apparent that the linkage member 22, the roller 20, the sleeve 10, the rods 11 and 13 and the bell-crank lever 15, 16 constitute adjusting means connected to the bending roller 18 and operable to adjust the latter to selected positions. Moreover the linkage member 40, the roller 29, the bracket 37, the rollers 34, the screw 33 and the shaft 27 constitute adjusting means connected to the pocket 28 and operable to adjust the latter to selected positions.

Coupling means are provided which operatively connect said drive means and adjusting means and are arranged to synchronize the movements thereof so that the shaping head will always be in a position to cause the wire shaped by said tool means 18 and 28 in accordance with said selected position thereof to emerge from said shaping head in one and the same direction relative to the support 2.

The coupling means comprise a sprocket 51 arranged to be driven by the chain 45 and carrying a horizontally extending camwheel 52 which is provided on its top surface with a face cam having two elevated portions 53 and 54. A cam follower 55 rigid with and depending from the linkage member 22 is arranged to engage and be lifted by the elevated portion 53 of the face cam against the force of the spring 24 in a predetermined angular range of the pivotal movement of the shaft 5 for an appropriate adjustment of the bending roller 18. A cam follower 56, rigid with and depending from the linkage member 22, is arranged to engage and be lifted by the elevated portion 54 of the face cam against the force of the spring 48 in a predetermined angular range of the pivotal movement of the shaft 5 for an appropriate adjustment of the pocket 28.

It will be obvious that this design of the coupling means is only an example of the many forms in which they may be provided and that the invention is in no way restricted to any specific form of such coupling means.

It will also be obvious that the face cam has been only diagrammatically shown on the drawing because the design of such cam as required for the manufacture of a predetermined spring strip is within the range of a person skilled in the art.

In the present example the shaping head will be pivotally moved from one extreme position, in which it is held during the formation of, e.g., a left-handed coil, to an intermediate position, in which it is held during the formation of the straight part of a connecting portion, and then to another extreme position, in which it is held during the formation of, e.g., a right-handed coil, whereafter the above sequence will be reversed. The face cam will then be designed so as to adjust the bending roller 18 and the pocket 28 to the positions which are appropriate for the shaping of the wire during the above-mentioned positions of the shaping head.

The individual turns of the compression spring strip may then be hooked together by means of a device which is indicated in FIGS. 1 and 3 but does not form a part of the present invention. The initial stress which is due to the trapezium shape of the compression spring strip will always ensure that the compression springs engage each under an appropriate stress. A modified device may be subsequently arranged when it is desired to manufacture spring strips of different type, e.g., spring strips in which the turns are interlaced rather than hooked together.

The manufactured compression spring strip can be stacked by winding it on a reel 47.

Various modifications are possible within the scope of the invention. This applies particularly to the means for driving the various elements.

What I claim is:

1. A machine for the manufacture of compression spring strips consisting of a continuous wire in the form of right-handed and left-handed, convolute compression springs in alternation, said machine comprising a support, a shaping head mounted on said support for pivotal movement relative thereto about a pivotal axis, means for feeding a wire through said shaping head, shaping-tool means mounted on said shaping head and adjustable relative thereto to selected positions and adapted to act in conjunction with said shaping head on the wire fed through said shaping head to form convolutions of selected hand in said wire in dependence on the relative position of said shaping-tool means and said head, drive means operatively connected to said shaping head and operable to pivotally move the same, adjusting means connected to said shaping tool means and operable to adjust said shaping tool means to selected positions, and coupling means operatively connecting said drive means and said adjusting means and arranged to synchronize the movements thereof so that the shaping head will be in a position to cause the wire shaped by said shaping tool means in accordance with the selected position thereof to emerge from said shaping head in the same direction relative to said support.

2. A machine as set forth in claim 1, in which said shaping head comprises a wire guide having an arcuate portion and said shaping tool means comprise an adjustable bending roller adapted to impart a curvature to said wire.

3. A machine as set forth in claim 2, in which said wire guide has a straight inlet portion having a longitudinal axis which substantially coincides with said pivotal axis and in which said arcuate portion is rigidly connected to and follows said inlet portion, said wire guide having an outlet forwardly of said arcuate portion and arranged to deliver said wire to said bending roller.

4. A machine as set forth in claim 2, which comprises a bracket rigid with said wire guide and in which said adjusting means comprise a linkage operable to adjust said bending roller, said linkage being mounted in said bracket for axial displacement in the direction of said pivotal axis and comprising a surface of revolution having an axis which coincides with said pivotal axis, and an adjusting member movable in a direction which is substantially parallel to said pivotal axis and coupled by said coupling means to said drive means.

5. A machine as set forth in claim 1, in which said shaping-tool means comprises means for imparting a lead of predetermined direction and magnitude to said wire.

6. A machine as set forth in claim 1, in which said shaping-tool means comprises an adjustable pocket for imparting a lead of predetermined direction and magnitude to said wire.

7. A machine as set forth in claim 6, in which said shaping head comprises a bracket rigid therewith and said pocket comprises two spaced parallel plates pivotally connected to said bracket.

8. A machine as set forth in claim 7, in which said adjusting means comprise a second bracket mounted on said shaping head for movement relative thereto parallel to said pivotal axis and comprising a surface of a solid of revolution having an axis which coincides with said pivotal axis, connecting means for operatively connecting said second bracket to said pocket, and an adjusting member movable in a direction which is substantially parallel to said pivotal axis and coupled by said coupling means to said drive means.

9. A machine as set forth in claim 8, in which said connecting means comprise a screw non-rotatably connected to said pocket and two rollers rotatably mounted in said second bracket and cooperating with said screw like half nuts.

10. An apparatus for the production of spring strips composed of a continuous wire formed with convolute springs wound in opposite senses, said apparatus comprising:

support means;
shaping-head means pivotally mounted on said support means for angular displacement about a pivotal axis;
feed means on said support means for passing a continuous wire through said shaping-head means;
shaping-tool means co-operating with said shaping-head means and selectively displaceable relatively thereto for forming wire emerging from said shaping-head means into springs wound alternately in opposite senses; and
drive means connected to said shaping-head means and said shaping-tool means for synchronously operating same.

References Cited by the Examiner
UNITED STATES PATENTS

| | | | |
|---|---|---|---|
| 708,128 | 9/02 | Cole et al. | 153—64 |
| 1,266,070 | 5/18 | Sleeper | 140—78 |

CHARLES W. LANHAM, *Primary Examiner.*